United States Patent
Loth (10) Patent No.: US 7,134,631 B2
(45) Date of Patent: Nov. 14, 2006

(54) VORTICITY CANCELLATION AT TRAILING EDGE FOR INDUCED DRAG ELIMINATION

(76) Inventor: John L. Loth, P.O. Box 4094, Morgantown, WV (US) 26504

( * ) Notice: Subject to any disclaimer, the term of this patent is extended or adjusted under 35 U.S.C. 154(b) by 11 days.

(21) Appl. No.: 10/865,195

(22) Filed: Jun. 10, 2004

(65) Prior Publication Data

US 2006/0006290 A1    Jan. 12, 2006

(51) Int. Cl.
B64C 21/06 (2006.01)
(52) U.S. Cl. ...................................... 244/209
(58) Field of Classification Search ............... 244/198, 244/199.2, 199.1, 199.4, 199.3, 209
See application file for complete search history.

(56) References Cited

U.S. PATENT DOCUMENTS

| | | | |
|---|---|---|---|
| 4,655,419 A | 4/1987 | van der Hoeven | |
| 4,714,215 A | 12/1987 | Jupp et al. | |
| 4,917,332 A | 4/1990 | Patterson, Jr. | |
| 5,150,859 A | 9/1992 | Ransick | |
| 5,297,764 A * | 3/1994 | Haney | 244/199.3 |
| 5,348,253 A | 9/1994 | Gratzer | |
| 5,562,414 A * | 10/1996 | Azuma | 416/90 A |
| 5,588,800 A | 12/1996 | Charles et al. | |
| 5,791,875 A | 8/1998 | Ngo | |
| 5,934,612 A * | 8/1999 | Gerhardt | 244/58 |
| 6,283,406 B1 | 9/2001 | Remington et al. | |
| 6,340,134 B1 | 1/2002 | Meschino | |
| 6,431,499 B1 | 8/2002 | La Roche et al. | |
| 6,513,761 B1 | 2/2003 | Huenecke | |
| 6,547,181 B1 | 4/2003 | Hoisington et al. | |
| 6,668,638 B1 | 12/2003 | Huang | |
| 6,719,246 B1 | 4/2004 | Corjon et al. | |

OTHER PUBLICATIONS

Loth, J.L., Loth, F. "Induced Drag Reduction with Wing Mounted Propellers", AIAA-84-2149, 2nd Applied Aerodynamics Conference. Aug. 1984, Seattle Washington.
Frisch, Bruce, Editor Aerospace America/Jan. 1985, "New Tricks for Cutting Drag".

* cited by examiner

Primary Examiner—Timothy D. Collins (57) ABSTRACT

Wing tip vortices are evident from airliner vapor trails, and helicopter blade slap. Elliptically loaded high aspect ratio tapered wings have minimum induced drag but cannot eliminate it. Different methods are disclosed herein, for upper and lower surface boundary layers to cancel their opposing vorticity upon shedding from the trailing edge, thereby eliminating wake vorticty, induced drag and associated noise. This requires wing-rotor-propeller or fan blades with a platform designed for uniform bound circulation and with boundary layer control near the tip. In addition this requires special techniques to counter span-wise pressure gradients, such as tip circulation control blowing or an upwind small propeller or wind turbine on each tip. These techniques can eliminate wake vorticity with its induced drag, noise, flying on the backside of the power curve and the option for asymmetric loading by pneumatic means to eliminate need for cyclic pitch control or conventional ailerons.

9 Claims, 8 Drawing Sheets

VORTICITY CANCELLATION AT TRAILING EDGE FOR INDUCED DRAG ELIMINATION

BACKGROUND OF THE INVENTION

1. Field of Invention

This invention relates to methods for a lifting body to eliminate induced drag and noise, by canceling the vorticity, generated in its upper and lower surface boundary layers, upon leaving the trailing edge, thus keeping it out of the wake. This technology applies to any lifting body such as a wing, helicopter rotor, propeller, fan blade, etc.

2. Prior Art

A powerful relation in theoretical aerodynamics was developed independently by German mathematician W. Kutta (1867–1944) and Russian mathematician N. Jouwkowski (1847–1921) and is called the Kutta-Joukowski theorem for a two-dimensional (2-D) lift producing body in an ideal fluid, which has no viscosity. Such a body produces lift per unit span equal to the sum of the up wash momentum in front of and the equal but opposite downwash momentum behind the lifting body. The lift per unit span produced is given in vector form by $\vec{L} = \rho(\vec{V}_\infty \times \vec{\Gamma})$, where the magnitude of the bound circulation, $\Gamma$, is defined as the value of any contour integral within the invicsid flow field surrounding the lifting body, $\Gamma = -\oint \vec{V} \cdot \vec{dl}$. For uniform 2-D loading, it is essential that $\Gamma$ remains constant and aligned in the span-wise direction from $+\infty$ to $-\infty$. In a real fluid, the bound circulation $\Gamma = -\iint (\nabla \times \vec{V}) \cdot \hat{n} dA$ equals the surface integral of vorticity, within the upper-and lower-surface boundary layers, were the flow field is rotational and unit vector $\hat{n}$ is normal to surface dA. At the trailing edge, the upper and lower surface boundary layers pressure, velocity and thus vorticity are equal in magnitude, aligned in the span-wise direction but opposite in sign. Therefore their vorticities will cancel each other upon entering the wake. That is why a 2-D lifting body produces a wake free from vorticity, induced drag or noise. If such a lifting body were operating in an ideal fluid, then there would be no friction drag, and no way to satisfy the Kutta condition, which is required to generate bound circulation.

All 3-D finite lifting bodies, such as wings on birds or aircraft reach a maximum lift per unit span $L_o$ and bound circulation $\Gamma_o$ at their centerline. From the centerline both L and $\Gamma$ reduce to zero at the wing tips. German mathematician H. Helmholtz (1821–1894) developed theorems, which define the basic concepts of vortex filament behavior in an ideal fluid:

1) The strength of a vortex filament is constant along its length.
2) A vortex filament cannot end in a fluid; it must extend to the boundaries of the fluid (which can be $\pm\infty$) or form a closed path.

Based on the Helmholz and Kutta-Joukowsky theorems, in an ideal fluid the only way for bound circulation to reduce to zero at the wing tips is for its excess to turn downstream and form of a vortex sheet, theoretically extending back to the airport. There it can form a closed path with its starting vortex which was left behind on take-off. Such an ideal fluid vortex model is often referred to as the multiple horseshoe vortex system. The entire amount of centerline bound circulation $\Gamma_o$ must shed into the wake from the trailing edge of each wing half. The results is a total wake net vorticity equal to twice $\Gamma_o$. The edge of such a wake is bordered by so-called wingtip vortices. The entire wake vorticity contributes to a net downwash velocity, $w_i$, within said two wingtip vortices. Beyond these, an updraft velocity is induced. On a clear day, wingtip vortices behind high-flying jet airliners are sometimes visible. Most of the jet engine exhaust gets entrained into these two wing-tip vortices, which can remain stable for miles downstream. Water vapor in the exhaust condenses to form a cloud, rendering them visible. Migrating birds prefer to fly in the updraft induced by the wake of the bird in front; this explains why birds usually fly in V-formation.

Wing area $S_w$ is defined as the product of wing span, b, times average chord, $c_{av}$. Then its aspect ratio is defined as $AR = b^2/S_w = b/c_{av}$. Downwash velocity, $w_i$, is perpendicular to the wake, and thus more or less perpendicular to the relative wind, $V_\infty$. The induced drag force per unit span is then in the direction of $V_\infty$, as given by $D = \rho V_\infty \Gamma$, and is equal to $D_i$ for the entire wing. Added to the wing friction drag $D_o$, gives a total wing drag $D_{wing} = D_o + D_i$. For an airplane there is additional drag created by the fuselage, etc, to give a total airplane friction drag $D_{para}$. Total airplane drag is then: $D_{total} = D_{para} + D_i$. When flying at a speed for maximum airplane lift to drag ratio $(L/D)_{max}$, then depending on the type of propulsion engine used, either the aircraft range or its endurance will be maximum. Most interesting is that $D_{para}$ increases with flight speed, while $D_i$ decreases with flight speed. Therefore, when these two contributions to airplane drag are plotted as a function of $V_\infty$, they cross one-another. At the flight speed were $(D_i = D_{para})$, $V_\infty$ is called $V_{opt}$ and $D_{total}$ reaches a minimum and L/D a maximum. Note that flying at $V_{opt}$, half of the required engine thrust and fuel consumption rate are used to overcome the induced drag $D_i$! This is a clear justification for eliminating induced drag and its associated noise, as long it requires substantially less power than the thrust power saved.

Since induced drag is inversely proportional to the aspect ratio $AR = b^2/S_w$, aircraft wings are designed with maximum span, but limited by the allowable wing root bending moment and the typical 80 meter gate footprint available at most large airports. In general, wing area is controlled by the allowable take-off and landing velocities, and results in a cruise speed a little higher than $V_{opt}$. For example, the Boeing 747 cruises at Mach 0.86 with a corresponding lift to drag ratio L/D=17.5, which is a little faster than at Mach 0.66 for a maximum L/D=18.5.

This explains why in the past half century so many patents have been filed with proposed solutions to reduce induced drag. It is interesting to note that all of these patents have concentrated their effort on either dispersing or countering vorticity in the most noticeable region of the wake, which is where the wing tip vortices originate. These solutions range from hanging a small drag chute, or mounting a multi-bladed rotor (either fixed, propeller or turbine type) from each wing tip. In addition wing tip end plates, fences, sails or winglets and wing tip blowing jets, circulation control, etc, have been used.

Of induced drag-reducing devices, only winglets have demonstrated sufficient benefits to find application on modem airliners. Their ability to reduce aircraft drag is less than 10%. Flight tests by NASA have proven that a small wind turbine mounted from the wing tip and operating inside the wing tip vortex can also reduce total drag by a few percent, but the turbine power recovered should be added to the thrust power saved. There are two obvious reasons why a wind turbine cannot be very efficient when placed inside a wing tip vortex. Such a vortex consists of a rolled up shed boundary layer, and therefore has greatly reduced total pressure. In addition, there is a vacuum in its center, much like a tornado. When a turbine removes the vortex rotational kinetic energy, its vacuum disappears in the turbine wake. With a wake pressure higher than upstream, there will be a flow reversal through the turbine center.

Existing technologies have failed to reach the potential for induced drag reduction. There are two reasons for that: 1) They are only applied in the wing tip region, where only a small portion of the total wake vorticity is being shed into the wake by the upper and lower surface boundary layers on the wing. 2) Most of these technologies concentrate on countering or dissipating wake vorticity after it has been generated, instead of preventing it from entering into the wake! That approach is like closing the barn door after the horses have escaped, and then chasing after them trying to catch a few.

The invention disclosed herein presents a different approach to eliminating induced drag:

1) Alter the wing design and use boundary layer control by suction to prevent boundary layer generated vorticity from entering the wake, or simply keeping the barn door closed.
2) Provide wing tip vorticity countering to prevent the formation of a wing tip spanwise pressure gradient. Such technology requires only a small fraction of the thrust power saved.

BACKGROUND OF THE INVENTION

3 Limitations of Prior Art

In 1922, Max Munk, a colleague of Prandtl, showed that induced drag $D_i$ is inversely proportional to wing aspect ratio AR and a minimum when the wing loading is elliptical. That is why the famous British World War II fighter plane, the Spitfire, has an elliptical wing platform. Currently all aircraft use a combination of wing taper and twist to approximate an elliptic load distribution. The induced drag $D_i$, which is minimum for an elliptically loaded wing, is in general given by $D_i = L^2/(0.5 \rho V_\infty^2 S_w \pi e AR)$. Here the spanwise efficiency factor, e, has been added to account for the increase in induced drag by deviating from an elliptic wing loading.

Prior art has concentrated on countering or dissipating wake vorticity in the region of the wing tip. But this limits the amount of vorticity, which can be prevented from entering the wake. To estimate the amount of wake vorticity shed in the wing tip region, relative to the total amount shed, equations are applied to a special case of the general elliptic load distribution, which is circular loading. Introduce the wing position angle, $\beta$, such that local lift per unit span $L = L_o \sin(\beta)$, where $\beta=0$ at the wing tip and $½\pi$ on the centerline. If the bound circulation in the center of the wing is, $\Gamma_o$, then the amount of vorticity shed into each wake half is, $\Gamma_o$. Define the regions where prior art has been applied to counter or dissipate wake vorticity, as two small regions of the wake, within distance, $r_c$, from each wing tip. Define the wake vorticity present in each of those regions by, $\Gamma_{tip}$. The fraction, f, of wake vorticity shed within distance, $r_c$, from each tip relative to the total vorticity shed into the entire wing wake is given by: $f = (2\Gamma_{tip})/(2\Gamma_o) = L_{tip}/L_o = \sin\beta$. Next relate distance, $r_c$, to angle, $\beta$. In the small triangle defined by $L_{tip}$, find: $\tan(½\beta) = r_c/(½b*\sin(\beta))$ or $r_c/(½b) = (2 \sin(½\beta)\cos(½\beta))*(\sin(½\beta)/\cos(½\beta)) = 2 \sin^2(½\beta) = 2(½\sin(\beta))^2 = 2(¼*f^2)$ or $f = (½r_c/(½b))^{1/2} = (r_c/b)^{1/2} = ((r_c/c_{av})/AR)^{1/2}$. Consider applying prior art with two ideal wind turbines of radius $r_t = ½c_{av}$, to dissipate each wing tip vortex. Assume they are placed inside the wing tip shed vortex with its shaft located in line with the wing tip and operated at the optimum Betz efficiency=16/27, or with a disc velocity equal to $⅔V_\infty$. Such a wind turbine has turbine inlet stream-tube diffusion, and therefore can only intercept wake vorticity from a smaller radius $r_c$ from the tip. Or: $r_c = r_t (⅔)^{1/2} = 0.8*r_t = 0.4*c_{av}$ or $(r_c/c_{av}) = 0.4$. Inserting the above equation for f, the fraction of wake vorticity passing through both wing-tip turbines is given by: $f = (0.4/AR)^{1/2}$. For a typical airplane with AR=10, f=20%. This means that such wing-tip turbines can at most affect 20% of the wake vorticity, or the reduction in induced drag can never exceed 20%. When flying at $V_{opt}$, this corresponds to a total drag reduction never exceeding 10%. This also corresponds with the performance limitation of winglets.

BACKGROUND OF THE INVENTION

Canceling Upper and Lower Surface Boundary Layer Vorticity at the Trailing Edge

This invention relates to methods of boundary layer control (BLC) on a finite lifting body to cancel boundary layer vorticity as it sheds from the trailing edge. These methods do not contradict Hemholt's theorems which state that vorticity cannot be terminated within an ideal fluid. The reason is that viscosity in real fluids allows boundary layer vorticity to be removed by suction into the vacuum side of a mechanical blower or ejector, where fluid viscosity dissipates its vorticity. This process is often displayed in museums when simulating a tornado. A Plexiglas cylinder is sealed on the bottom. A pan with boiling water, or smoke generator is placed in its middle. A small exhaust fan mounted in the middle of the top cover is started up. As air is drawn out of the cylinder, fresh air is allowed to enter through tangential entry ports into the cylinder. Conservation of angular momentum increases its angular velocity as it approaches the centerline and there the pressure drops. The radial pressure gradient next to the floor is reduced by friction thereby setting up a radial inflow teacup like flow pattern. Steam or smoke released in the middle renders this simulated tornado visible. The fan in the exhaust completely dissipates the entering tornado vorticity by viscous effects in its rotor and none of it remains in the exhaust.

Therefore, five theorems for real viscous fluids are formulated here.

1) To produce lift on an airfoil, a viscous boundary layer is required. The lower surface boundary layer satisfies the Kutta condition at the trailing edge and provides entrainment for the upper boundary layer to do likewise.
2) Vorticity is generated throughout the boundary layer of thickness $\delta$ by shear forces. A contour integral taken clockwise in the plane perpendicular to the span, and external to the boundary layer of thickness $\delta$, equals the bound circulation $\Gamma$.
3) The boundary layer vorticity in the upper and lower boundary layer are in opposite directions. Only when their integral value is different in magnitude will the contour integral $\Gamma = \oint \vec{V} \cdot \vec{dl}$, produce a net bound circulation $\Gamma$, which determines lift and induced drag per unit span: $\vec{L} = \rho_\infty (\vec{V}_\infty \times \vec{\Gamma})$ and $\vec{D}_i = \rho_\infty (\vec{w}_1 \times \vec{\Gamma})$.
4) A uniform finite 3-D wing, can only have a uniform span wise loading if equipped with:
   a) A wing tip vortex countering device, capable of eliminating all span wise pressure gradients so that the bound circulation vector will align with the wing span all the way down to the wing tip. Only then will the vorticity in upper and lower boundary layer cancel each other upon shedding from the trailing edge.

b) To assist in the cancellation of boundary layer vorticity upon shedding, a short suction slot should be added to the trailing edge adjacent to the wing tip.

5) Consider a wind tunnel test, with a uniform wing mounted in between two opposing walls, and with tunnel wall-boundary layer removed by suction through pores in the wind tunnel walls in order to assure uniform velocity over the wing. To make the wing bound circulation truly two-dimensional (2-D), the boundary layer formed in the corners between the wing and the wall must also be removed by suction. This is accomplished by adding a narrow suction slot in the upper and lower surface corner intersection with the walls.

The success of achieving near 2-D loading on a finite wing depends on the wing tip vortex-countering device used. This can range from an end plate, with or without blowing, or by a propeller or turbine rotor producing a wake with sufficient counter rotation. If this is over-driven, the result will be an induced updraft on the wing, producing some induced thrust instead of induced drag, which compensates partially for the excess power used to over-drive the counter rotating vortex. When successful in preventing shedding vorticity into the wake, and thus eliminating induced drag at all flight speeds $V_\infty$, the ideal thrust-power required $TP_{ideal}$ can be related to that of a wing with elliptic loading by:

$$\frac{TP_{ideal}}{TP_{elliptic}} = \frac{C_{Dpara}*(0.5\rho_\infty S_w)*V_\infty^3}{C_{Dpara}*(0.5\rho_\infty S_w)*V_\infty^3*\left[\left(\frac{V_{opt}}{V_\infty}\right)^2+1\right]} = \frac{1}{\left[\left(\frac{V_{opt}}{V_\infty}\right)^2+1\right]}$$

This shows that thrust power savings can exceed 50% when $V_\infty < V_{opt}$, but are less than 50% when $V_\infty > V_{opt}$.

The following is an estimate of the power required for boundary layer by suction at $V_\infty = V_{opt}$, to prevent vorticity from shedding from the trailing edge of a uniformly loaded wing. To provide boundary layer removal by suction all along the trailing edge, as would be needed with a elliptically loaded wing would require far more power then possibly saved in thrust power! This analysis is based on assuming an aircraft flying at a Reynolds number Re=$10^6$ and $(L/D)_{max}$=15 at $C_L$=0.6, aspect ratio AR=10 and trailing edge turbulent boundary layer thickness $\delta$=0.37*c/(Re)$^{0.2}$=0.023*c. For all boundary layers, with thickness $\delta$, one can assume that most of the vorticity is contained within its momentum displacement thickness $\delta_2 \cong 0.1*\delta$. Consider removing the boundary layer vorticity by suction at the trailing edge over a distance of ½c from the wing tip. This requires removing at least a total volume flow rate of: $Q_{suction}$=4*(½c)*($\delta_2$)*$V_\infty$=2*$c^2$*0.0023$V_\infty$, assuming a suction $\Delta p$ equal to $-q_{2\delta}$, then the minimum suction power required, $P_{suction}$=$q_\infty$*0.0046*$c^2$*$V_\infty$. Comparing to the thrust power required $P_{thrust}$=D*$V_\infty$=(L/(L/D))*$V_\infty$=$C_L$*$q_\infty$*($S_w$=AR*$c^2$)*$V_\infty$/(L/D), the ratio of $P_{suction}$/$P_{thrust}$=0.0046/($C_L$*AR/(L/D))=0.012.

If this suction power is supplied by small wind turbines, one on each wing tip at an assumed 25% efficiency, the ratio of suction power to thrust power required $P_{suction}$/$P_{thrust}$=0.012/0.25=4.28%. The wing tip mounted wind turbine wake circulation may be sufficient to eliminate spanwise pressure gradients near the wing tip.

An alternate solution is to use an ejector to provide the required suction power and using its exhaust to provide Coanda blowing over a rounded wing tip making the associated power required higher. Make the following assumptions: provide a suction at $\Delta p = -q_\infty$. Use a Coanda jet blowing velocity of at least $V_{jet}$=1.5 $V_\infty$ or a dynamic pressure $q_{jet}$=$1.5^2$ $q_\infty$; supply air ejector with volume flow rate of $Q_{supplied}$=$Q_{suction}$; assume an ejector efficiency of 50%. Equating the compressed air supply power minus the power required for ejector suction to the blowing air power required: 50%*($q_{supplied}$*$Q_{supplied}$)−($q_\infty$*$Q_{suction}$)=$q_{jet}$*($Q_{supplied}$+$Q_{suction}$). The compressed air supply pressure is: $q_{supplied}$=11$q_\infty$. In that case, $P_{suction}$/$P_{thrust}$=11*0.008=9%. If this technique eliminates the induced drag power when flying at $V_{opt}$, then the thrust power savings are still 50%−9%=41% (four times better than achievable with a winglet).

The savings in cruise power promise to be significant. Increase in power available during take-off and landings, with a high lift system, will be even more significant. This will eliminate the current problem of having to operate on the backside of the power curve with most high lift systems.

Additional benefits of having a uniformly loaded rectangular wing with BLC and same root chord and wing area are that it reduces wingspan by 21.5% and the wing root bending moment by 7.5%. By eliminating wing twist the average lift coefficient increases allowing for a higher payload. This would allow a new large airplane with 510 passengers, a range of 8000 nautical miles and a 650 square meter wing area to have the same wingspan and root chord as the current 400 passengers Boeing 747–400 with 511 square meter wing area.

At low speed it also provides a reliable technology for wing tip stall protection. Then deflecting both ailerons upwards will reduce their effective angle of attack. Roll control can also be achieved by asymmetric reduction in boundary layer suction and blowing. This produces an induced drag with loss of lift resulting in a coordinated turn, which is better than conventional ailerons with their adverse roll-yaw coupling and tip stall characteristics. This same technology can be applied to helicopter rotors to replace cyclic pitch control and reduce noise on propeller and fan blades as well. Then the required BLC compressed air can be provided by a pumping action inside its hollow blades.

The theories presented herein are meant to provide aerodynamic background for this invention only and are not intended to limit the scope of the invention or to serve as the only means by which the embodiments of the invention may operate.

SUMMARY

In accordance with the present invention, the methods required to cancel the upper and lower surface boundary layer vorticity upon shedding from the trailing edge of a finite wing or rotor blade has been described in detail. To accomplish this feat with an elliptically loaded wing would require far more suction power than the potential gain in thrust power savings. Only by configuring the finite wing or rotor blade to have constant bound circulation, so that the upper and lower surface boundary layer vorticity cancels each other upon shedding from the trailing edge, will the power required reduce to less than 10% of the thrust power saved. This makes it a desirable technology for future aircraft, helicopters, propellers and fans.

BRIEF DESCRIPTION OF THE DRAWINGS

FIG. 2 shows the tip portion of a 3-D wing, as viewed looking at the bottom aft end. Only the aft portion of an end plate is shown as needed to counter span-wise pressure gradients. The two ejectors shown are vacuum sources for upper and lower surface boundary layer control by suction.

FIG. 8 is a schematic drawing of a shrouded propeller or fan. This shroud contains a groove in which the blade tip travels. The pressure difference across the actuator disc provides flow reversal inside this groove, to trap the wing tip vortex in its low-pressure center, simulating blade tip boundary layer suction. Shedding a distributed vortex sheet from the groove eliminates the noisy interaction between individual tip vortices. It also keeps the flow attached to the short wide-angle diffuser, to minimize shroud wake drag while increasing propeller or fan flow rate.

DETAILED DESCRIPTION OF THE PREFERRED EMBODIMENT

Figure 1:
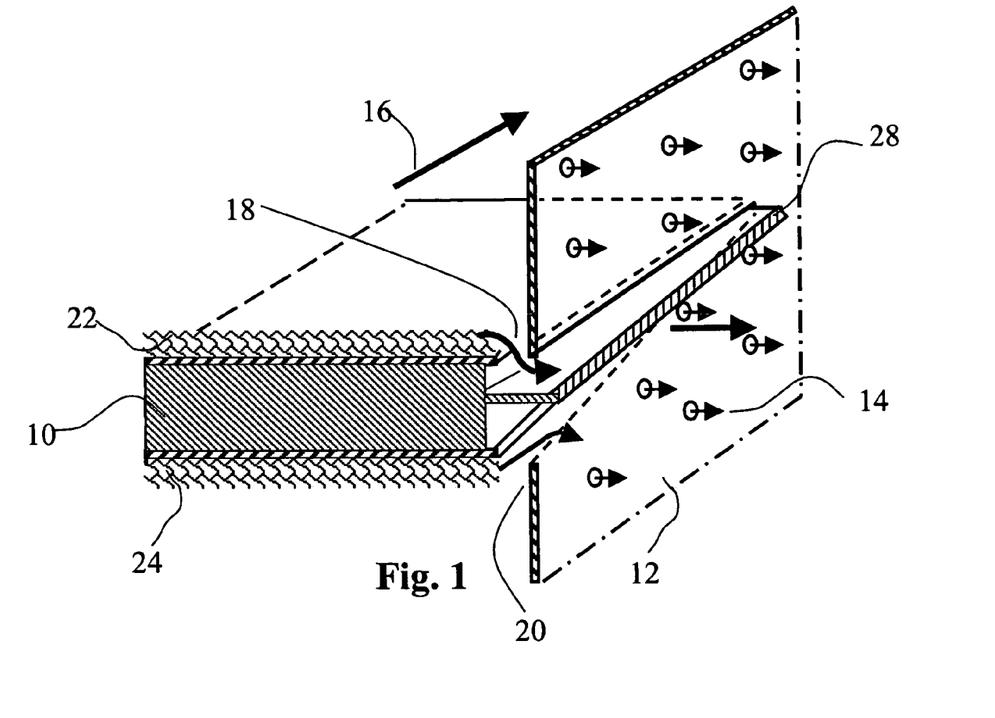
FIG. 1 shows a uniform wing mounted in a wind tunnel, between two opposite walls. To achieve true 2-D loading and performance on this wing, the following methods have been applied; the boundary layer on the wind-tunnel wall is removed by suction and the boundary layers in the wing-wall corner intersections have been removed by suction.

FIG. 1 shows the trailing edge segment of a 2-D wing 10 mounted in a wind tunnel, between two opposing walls. To achieve true 2-D loading and performance on this wing, the following methods have been applied. Numerous small holes 14 have been drilled through the tunnel wall 12 with the proper level of vacuum applied to remove only the tunnel boundary layer so as to maintain a uniform lift generating relative wind 16 over the wing. Boundary layer control by suction is applied to assure that the bound circulation contained within the boundary layer, remains aligned in the span-wise direction. The upper boundary layer 22 is removed through upper slot 18 while the lower boundary layer 24 through lower slot 20 at the intersection between the airfoil and the tunnel wall. This assures uniform 2-D loading of the wing along its entire span. To prevent short-circuiting of the higher-pressure air below the wing to the lower pressure air above the wing, suction slots 18 and 20 are separated by a divider plate 28, which extends well into the vacuum behind the tunnel walls. Only when sufficient vacuum is available can the same vacuum source be used to remove both upper and lower surface boundary layers.

Figure 2:
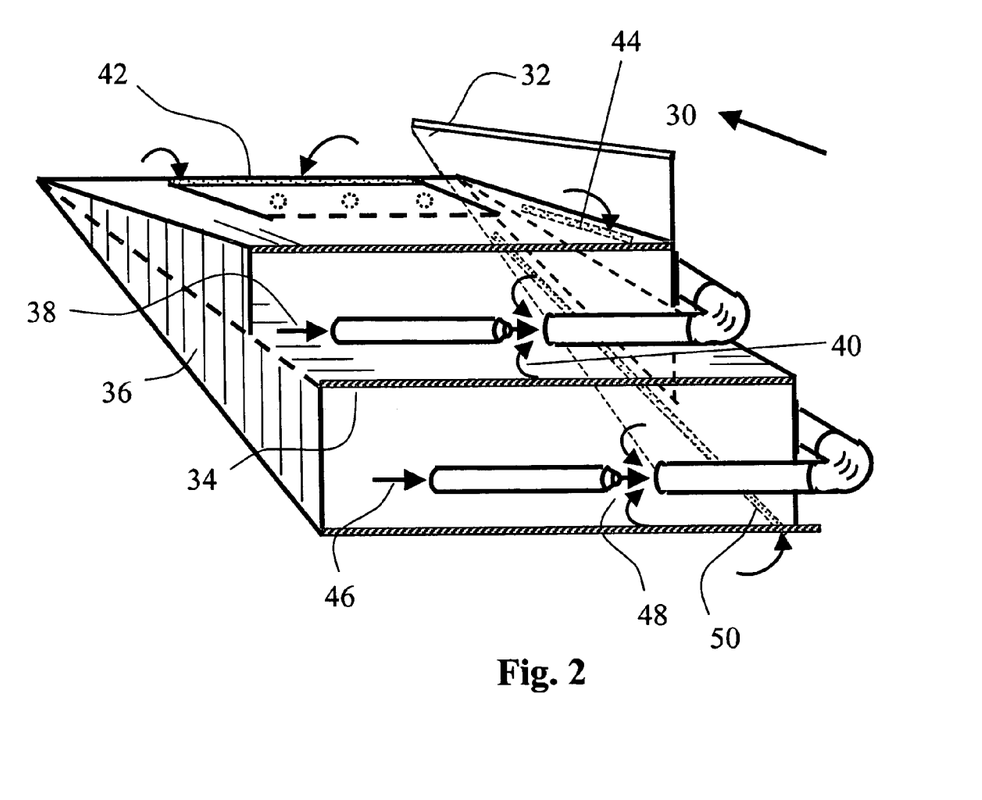

FIG. 2 is a schematic drawing of the aft portion of a 3-D wing tip as viewed looking at the bottom aft end of a section through its compartmentalized wing tip. An arrow indicates the lift generating relative wind 30. Only the pointed aft end of end plate 32 is shown. Such an end plate is the minimum required to counter the formation of wing tip span-wise pressure gradients. Divider plate 34 separates the upper and lower compartments of the tip section. Their wing tip end is sealed by fence 32 and inboard end rib plate 36. Compressed air 38 is supplied to ejector 40 to provide vacuum for trailing edge suction slot 42 and for wing bottom suction slot 44 adjacent to end plate 32. An elbow at its outlet allows it to discharge through end plate 32 in the aft direction for thrust recovery. Compressed air 46 is supplied to ejector 48 to provide vacuum for a wing upper surface suction slot 50 adjacent to end plate 32. An elbow at its outlet allows it to discharge through end plate 32 in the aft direction for thrust recovery. Suction slots are best machined in removable bolt-on covers to faciltate cleaning.

Figure 3:
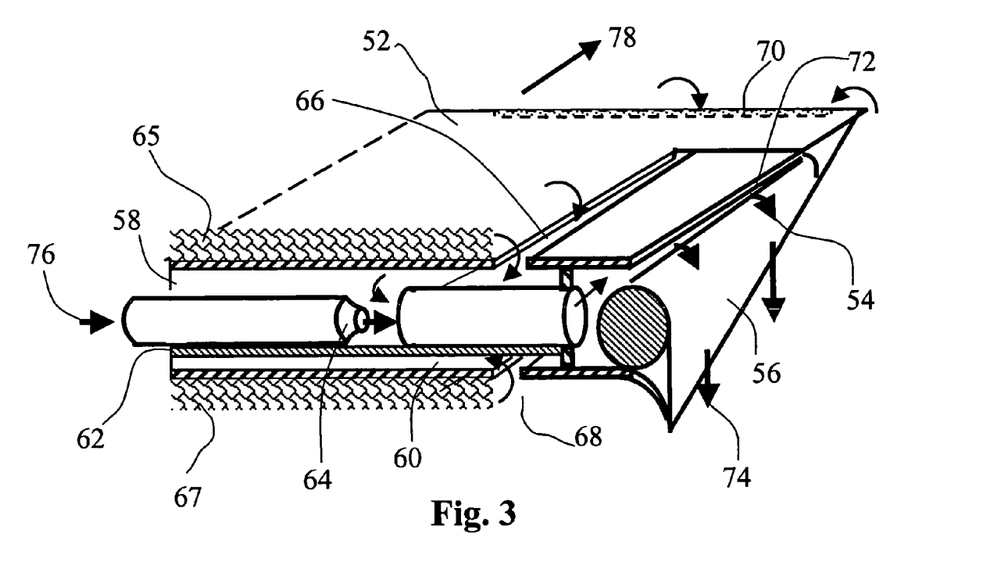
FIG. 3 shows the same BLC by suction as in FIG. 2 but with end plate replaced by a rounded downward facing fence with Coanda wall jet blowing, using air supplied by the two ejector outlets. The Coanda wall jet blowing enhances 2-D loading of the wing. The conventional ailerons with their adverse roll yaw coupling can be replaced by asymmetric boundary layer control by suction.

FIG. 3 is a schematic drawing of the rear segment of the compartmentalized tip of a 3-D wing 52 or rotor blade with a Coanda wall-jet 54 blowing over a rounded end plate 56. The wing or rotor blade tip has an upper compartment 58 and lower compartment 60, separated by plate 62. Ejector 64 provides a vacuum in upper compartment 58 for upper surface boundary layer 65 removal by suction through slot 66. Another ejector provides a vacuum in lower compartment 60 for lower boundary layer 67 removal by suction through slot 68 and for both upper and lower boundary layer suction through trailing edge slot 70. Both ejectors discharge through the Coanda wall jet slot 72 to provide circulation control over rounded end plate 56, which if blown hard enough act as a jet flap 74. This eliminates all span-wise pressure gradients to prevent high-pressure air from the lower surface from flowing around the end plate and initiate a tip vortex. In case of a wing compressed air 76 can be supplied from the fuselage or in case of a rotor blade by pumping action compression on the fluid inside an internal passage open at the hub. The lift generating relative wind is indicated by arrow 78.

Figure 4:
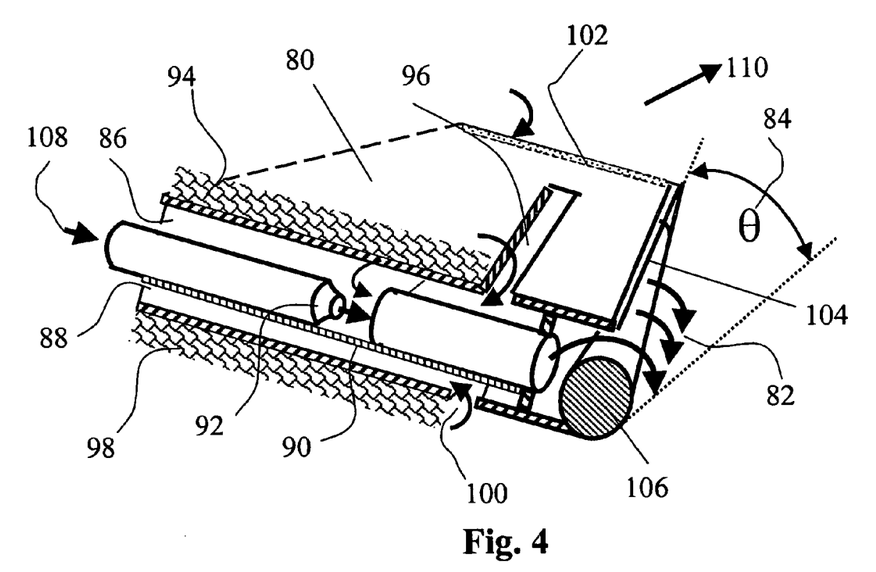
FIG. 4 shows the same BLC by suction as in FIG. 2 but with the end plate replaced by a rounded streamlined wing tip, set at slant angle θ, with Coanda wall jet blowing supplied by the two ejector outlets. The option of asymmetric boundary layer control by suction can replace the need for conventional ailerons or cyclic pitch control on a helicopter rotor.

FIG. 4 is a schematic drawing of the rear segment of the compartmentalized tip of a 3-D wing 80 or rotor blade with a Coanda wall-jet 82 blowing over a rounded wing or rotor tip 106 tilted inwards by angle θ 84, to make the Coanda blowing more effective. The wing or rotor blade tip has an upper compartment 86 and lower compartment 88, separated by divider 90. Ejector 92 provides a vacuum in upper compartment 86 for upper surface boundary layer 94 removal by suction through slot 96. Another ejector provides a vacuum in lower compartment 88 for lower boundary layer 98 removal by suction through slot 100 and for both upper and lower boundary layer suction through trailing edge slot 102. Both ejectors discharge through Coanda wall jet slot 104 to provide circulation control over rounded tip 106. The Coanda jet counters the formation of span wise pressure gradients by preventing high-pressure air from the lower surface from flowing around the tip-fence to initiate a wing tip vortex. In case of a wing compressed fluid 108 is supplied from the fuselage or in case of a rotor blade by pumping action compression of the fluid inside an internal passage which is open at the hub. The lift generating relative wind is indicated by arrow 110.

Figure 5:
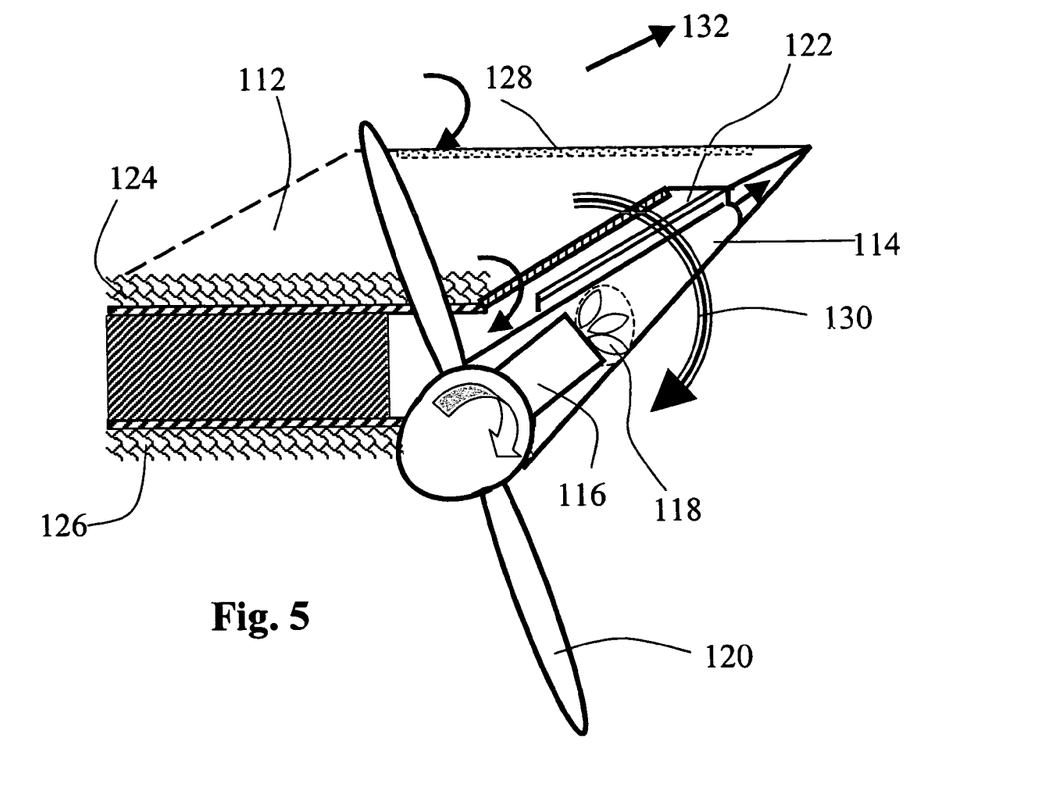
FIG. 5 shows the same BLC by suction as in FIG. 2 but here an engine driving a small propeller and a blower for BLC by suction has replaced the end plate and need for two ejectors. Note the wake rotates in the direction to induce an up wash on the wing, this is in the same direction as the propeller rotation. The option of replacing the conventional ailerons with boundary layer suction modulation as in FIG. 3 applies as well.

FIG. 5 is a schematic drawing of the aft tip of a 3-D wing 112 with a wing tip nacelle 114 containing a small engine 116 inside. This engine drives at least one small internal vacuum pump 118 as well as a small propeller 120. Said vacuum pump provides suction in upper surface slot 122 to remove upper boundary layer 124 and in lower surface suction slot to remove lower boundary layer 126. In addition upper and lower boundary layers are removed through a short trailing edge slot 128. To achieve uniform wing loading, the propeller blade pitch is adjusted to optimize the amount of wake circulation 130 produced, in the direction of propeller rotation, as needed to prevent high-pressure air from below the wing to reach the low-pressure region above the wing. The free stream relative velocity is indicated by arrow 132.

Figure 6:
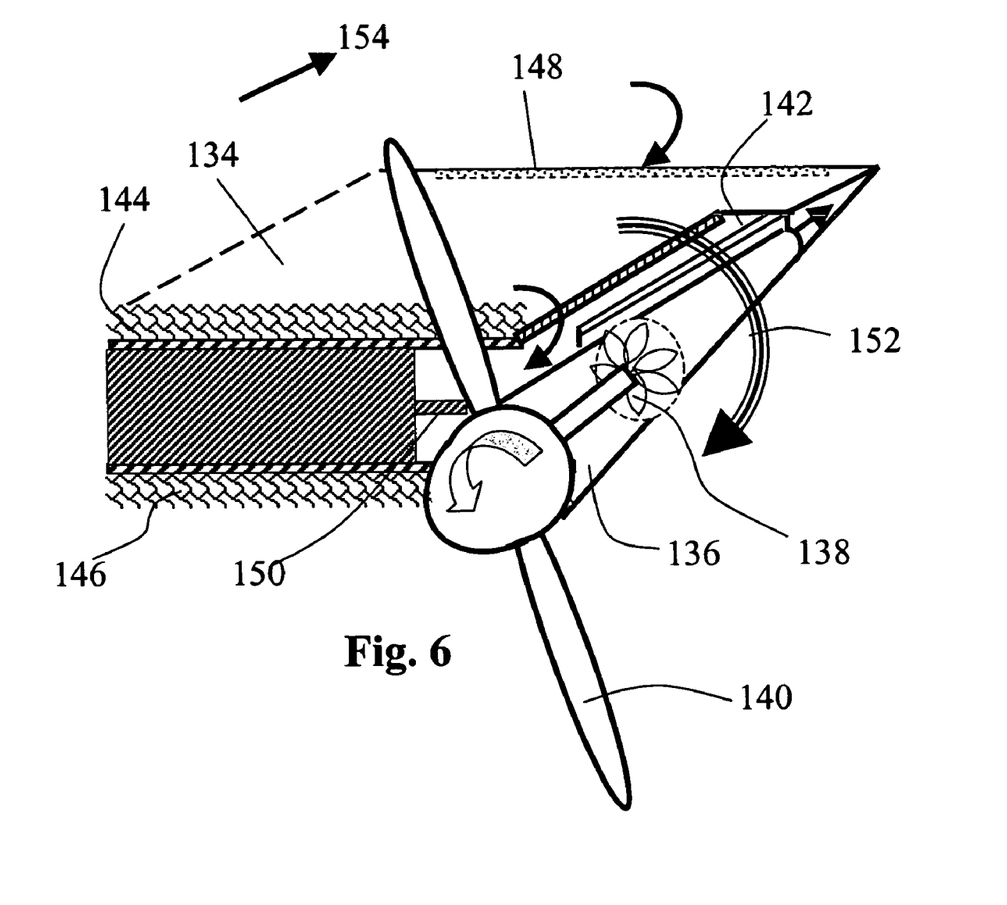
FIG. 6 shows the same BLC by suction as in FIG. 2 but here a small wind turbine driving the blower for BLC by suction has replaced the end plate and need for two ejectors. Note the wake rotates in the direction to induce an up wash on the wing, which is opposite to that of the wind turbine rotation. The option of replacing the conventional ailerons with boundary layer suction modulation as in FIG. 3 applies as well.

FIG. 6 is a schematic drawing of the aft tip of a 3-D wing 134 with a wing tip nacelle 136 containing at least one small vacuum pump 138, driven by a small wind turbine 140. One of said pumps provides vacuum in the upper compartment to provide suction for slot 142 and remove the upper boundary layer 144, while the other pump in the lower compartment provides suction in a slot to remove lower boundary layer 146 and suction for the short trailing edge slot 148. The upper and lower compartments are divided by plate 150. To achieve uniform wing loading, the turbine blade pitch is adjusted to optimize the amount of wake circulation 152 produced, in the direction opposite to that of the turbine rotation, as needed to prevent high-pressure air from below the wing to reach the low-pressure region above the wing. The free stream relative velocity is indicated by arrow 154.

Figure 7:
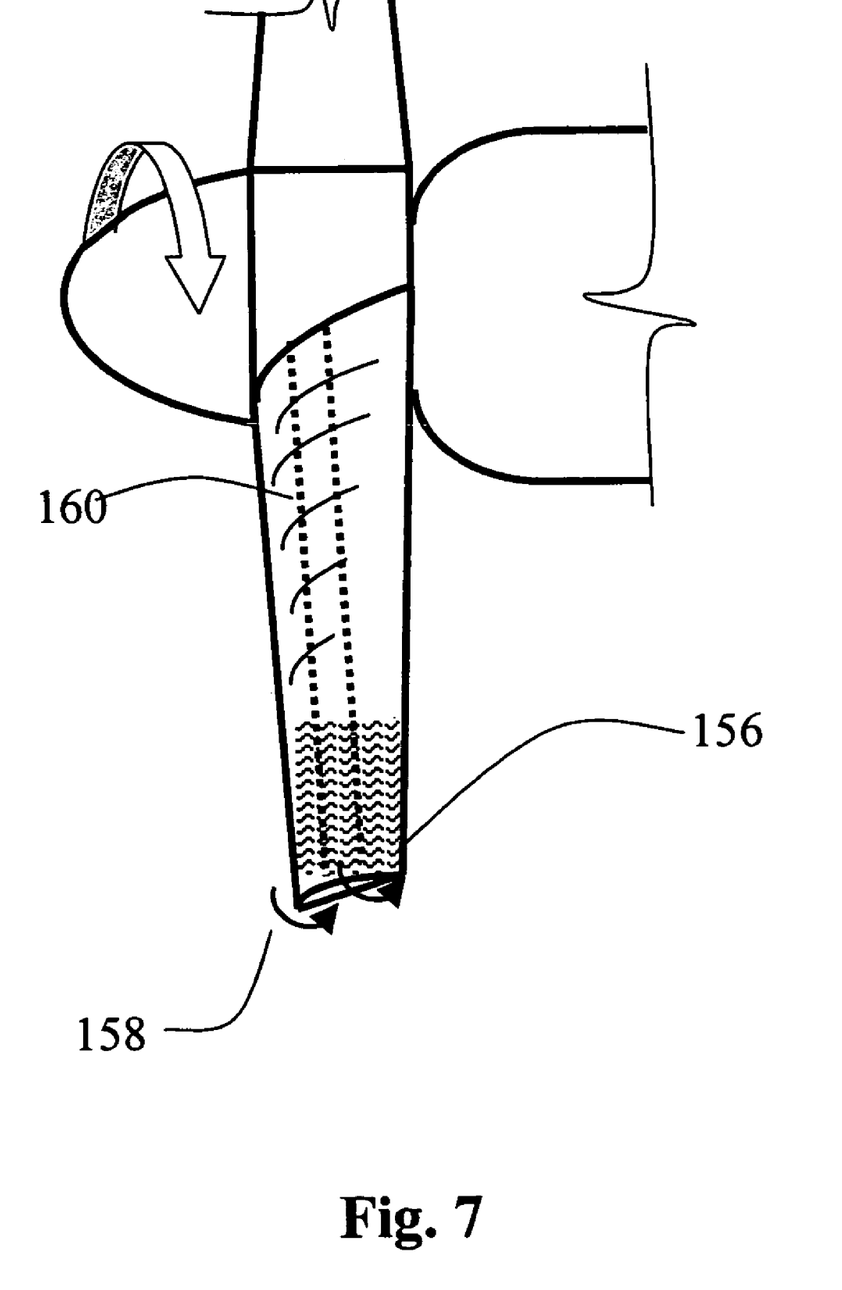
FIG. 7 is a schematic drawing of a helicopter rotor, propeller or fan blade with circulation control Coanda wall jet blown over is rounded tip. Centrifugal force acting on the air inside the hollow blade, which is open near the hub, provides the blowing air at the tip. The presence of the Coanda jet extends the location of the lift peak further out to the tip, providing more lift and reduces noise by tip vortex diffusion. When a valve is installed in the Coanda jet air supply, it can be modulated to replace the need for cyclic pitch control.

FIG. 7 is a schematic drawing of a blade of a: helicopter, propeller, or fan with boundary layer control by suction 156 and circulation control by blowing 158 as in FIG. 4, showing an internal passage 160 which is open at the hub, or a hollow blade, in which fluid is compressed by pumping action to power both boundary layer suction and blowing at the tip.

Figure 8:
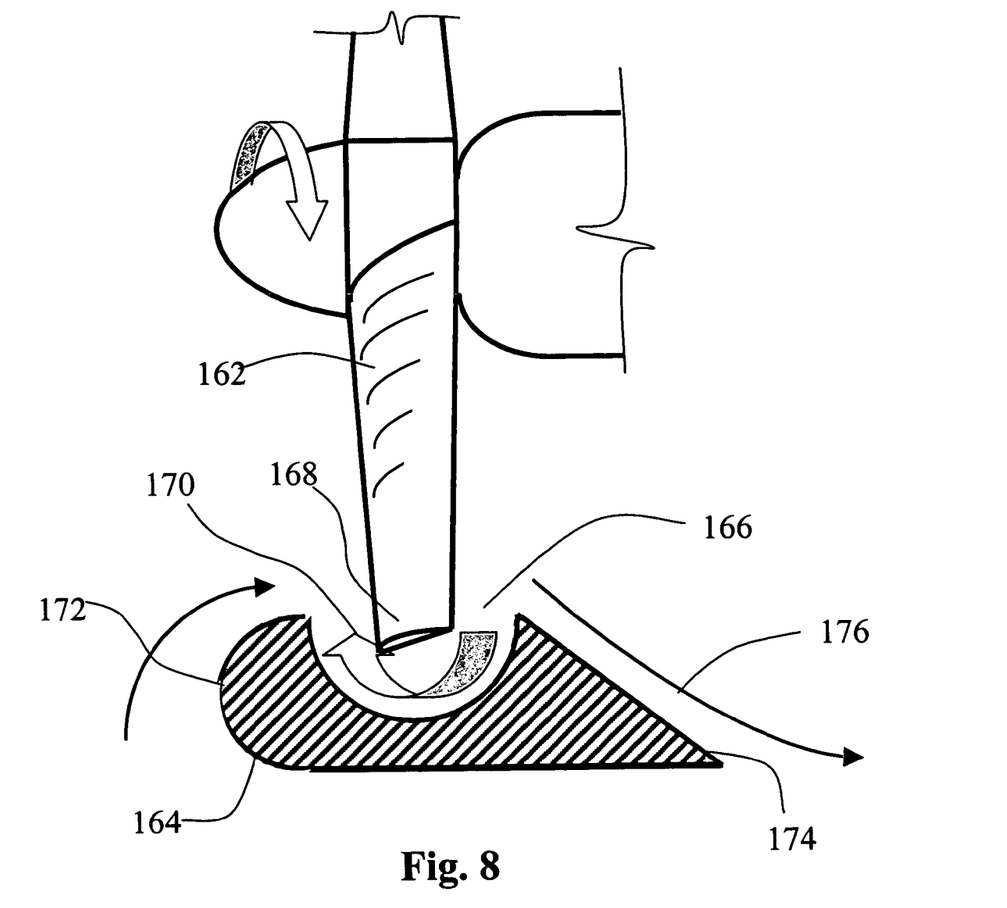

FIG. 8 is a schematic drawing of a rotor blade 162 of a propeller, or fan, operating within a shroud 164, comprising a rounded groove 166 in which the blade tip 168 travels. The pressure difference across the rotor produces a reverse flow inside the rounded groove to form a standing trapped vortex 170 within groove 166 with a vacuum at its center. The blade tip vorticity sheds into trapped vortex 170 and from this groove the vorticity is shed as a uniform sheet along streamline 176 to aid in wake diffusion. This has three advantages: 1) It eliminates noise shed by tips of individual blades, 2) expands the wake diameter thereby lowering the pressure downstream of the propeller for increased mass flow rate and thrust produced. 3) reduces the shroud wake drag. As the in and outflow through the shroud is aided by the presence of the trapped vortex, the shrouds rounded inlet 172 and angular exhaust diffuser 174 can be made very short and of light weight. When a semi-circular shroud is used to produce lift in a "Gull Wing" like configuration for a Short Take-Off and Landing aircraft, the inlet portion of the shroud length should be increased to equal that of the wing cord of which it is part.

It is understood that the methods of boundary layer control are well known in the prior art and the embodiments presented herein are only exemplary and are not intended to limit the scope of the appended claims. Modifications of the present invention will become obvious to those skilled in the art in light of the detailed description in the specification and drawings herein and such modifications are intended to fall within the scope of the appended claims.

I claim:

1. An apparatus comprising:
a lift producing finite wing comprising a finite semi-span ending in a tip, with an upper surface, a lower surface, a leading edge, and a trailing edge;
the wing moving through a fluid, the fluid having an undisturbed, free stream velocity relative to the wing;
one or more boundary layer control suction slots positioned near the tip of the finite wing parallel and in close proximity to the trailing edge in at least one of the upper surface, the lower surface or the trailing edge itself;
one or more boundary layer control suction slots positioned near the tip the wing in the chordwise direction and in close proximity to at least one of the upper surface, the lower surface and the tip itself;
at least one vacuum source lowering the pressure inside the suction slots to below that found on the surrounding lifting surfaces and pneumatically connected to at least one of the boundary layer control suction slots; and
operation of at least one vacuum source to capture by suction most of the upper and lower surface boundary layer vorticity within the proximity of the wing tip, prior to shedding the remaining boundary layer at the trailing edge, thereby substantially reducing spanwise pressure gradients over the tip portion of the lift producing finite wing and substantially eliminating shedding of boundary layer vorticity from the wing.

2. The apparatus in claim 1 wherein at least one vacuum source comprises at least one of an ejector, a mechanical movement type vacuum pump or pumping action of a propeller with the ability to dissipate internally, by viscous means, the captured boundary layer vorticity.

3. The apparatus in claim 1 wherein the at least one vacuum source discharges mass flow captured by the suction slots, in the form of a wall jet to improve alignment of the wing upper and lower surface boundary layer velocities with the direction of the free stream velocity by directing said wall jet tangentially to a rounded wing tip end which is positioned substantially in the chordwise direction, such that the wall jet attaches to the rounded wing tip surface by Coanda effect and the wall jet flows in the general direction from the upper surface towards the lower surface of the wing.

4. The apparatus in claim 1 wherein the at least one vacuum source discharges mass flow captured by the suction slots, in the form of a jet in parallel to the end surface of the tip and substantially in the chordwise direction while originating in the vicinity of the tip leading edge.

5. The apparatus in claim 1 wherein the inner region of the wing is shaped such as to substantially generate a substantially uniform loading in order to maximize alignment of the wing upper and lower surface boundary layer velocity in the free stream velocity direction, thereby maximizing the effectiveness of boundary vorticity capturing and dissipation within suction slots positioned in the proximity of the wing tips.

6. The apparatus of claim 1 further comprising a minimized tip region area by the application along the tip region extremity of one of a boundary layer suction slot, a fence, or circulation control by blowing over a rounded surface.

7. The apparatus of claim 1, applied to a rotor blade, where one or more suction slots are installed along or in the vicinity of the blade trailing edge to capture most of the vorticity contained within upper and lower surface boundary layers of the blade and dissipate the captured vorticity, by viscous means, with one of an ejector type compressor, a mechanical type compressor, or other mechanical means, prior to venting captured mass flow back into the wake, in order to minimize wake vorticity with its associated downwash velocity, induced drag and noise.

8. The apparatus of claim 1, applied to a rotor blade, where one or more suction slots are installed in the chordwise direction along at least one of the upper and lower surface of the rotor blade along the common boundary between an inner span region and tip region, for the purpose of minimizing spanwise pressure gradients which interfere with usual vorticity cancellation between upper and lower surface boundary layers when shed at the trailing edge of the inner span region of said lifting surface.

9. The apparatus of claim 1, applied to a rotor blade, comprising of a minimized tip region area wherein said boundary suction is provided via internal ductwork to a mechanical compressor(s) or ejector pump, capable of dissipating the captured vorticity and discharging an non-rotational flow back into the wake or via a circulation control jet positioned along the extremity of the tip region.

* * * * *